United States Patent [19]

Yorke

[11] Patent Number: 4,671,888
[45] Date of Patent: Jun. 9, 1987

[54] POLYELECTROLYTE AND SURFACTANT COMPOSITIONS FOR CONTROLLING ALKALINE EARTH METAL SCALES

[75] Inventor: Monica A. Yorke, Coraopolis, Pa.

[73] Assignee: Calgon Corporation, Pittsburgh, Pa.

[21] Appl. No.: 834,700

[22] Filed: Feb. 28, 1986

Related U.S. Application Data

[62] Division of Ser. No. 677,660, Dec. 3, 1984, Pat. No. 4,589,985.

[51] Int. Cl.$^4$ ............................................. C02F 5/14
[52] U.S. Cl. ..................................... 252/180; 252/82; 252/174.16; 252/174.24
[58] Field of Search ................ 252/82, 174.16, 174.24, 252/180

[56] References Cited

U.S. PATENT DOCUMENTS

| | | | |
|---|---|---|---|
| 3,898,037 | 8/1975 | Lange et al. | 210/701 |
| 3,928,196 | 12/1975 | Persinski et al. | 252/180 |
| 3,951,793 | 4/1976 | Tate et al. | 210/698 |
| 4,427,568 | 1/1984 | Snyder et al. | 252/180 |

FOREIGN PATENT DOCUMENTS 58-92499 6/1983 Japan .

*Primary Examiner*—Robert A. Wax
*Attorney, Agent, or Firm*—W. C. Mitchell; R. B. Olson; M. C. Sudol, Jr.

[57] ABSTRACT

The instant invention is directed to a method of inhibiting the precipitation and deposition of alkaline earth metal scales in an aqueous system, comprising adding to said system an effective amount of (a) an anionic polyelectrolyte; and (b) an anionic surfactant, wherein said polyelectrolyte/surfactant ratio ranges from 1000:1 to 1:10, by weight.

2 Claims, No Drawings

POLYELECTROLYTE AND SURFACTANT COMPOSITIONS FOR CONTROLLING ALKALINE EARTH METAL SCALES

This is a division of application Ser. No. 677,660, now U.S. Pat. No. 4,589,985 filed Dec. 3, 1984.

BACKGROUND OF THE INVENTION

Most commercial water contains alkaline earth metal cations, such as calcium, magnesium, etc., and anions such as carbonate, sulfate, and phosphate. When combinations of these anions and cations are present in concentrations which exceed the solubility of their reaction products, precipitates form until their product solubility concentrations are no longer exceeded. These precipitates are alkaline earth metal scales. For example, when the concentrations of calcium ion and the above mentioned anions exceed the solubility of the calcium-anion reaction products, a solid phase of calcium scales will form as a precipitate.

Solubility product concentrations are exceeded for various reasons, such as evaporation of the water phase, change in pH, pressure, or temperature, and the introduction of additional ions which can form insoluble compounds with the ions already present in the solution. As these reaction products precipitate on heat transfer surfaces in contact with aqueous streams, they form scale. The scale prevents effective heat transfer, interferes with fluid flow, facilitates corrosive processes, and harbors bacteria. Scale is an expensive problem in many industrial water systems, causing delays and shut downs for cleaning and removal. Alkaline earth metal scales commonly form on the metallic surfaces of apparatuses used for thermal treatment of aqueous solutions and suspensions. By alkaline earth metal scales, we mean scales including but not limited to calcium carbonate, magnesium carbonate, calcium phosphate, and calcium sulfate. These scales form frequently in the tubes in the heat exchangers and on other heat exchange surfaces.

In the past, alkaline earth metal scale inhibition has been facilitated by the use of anionic polyelectrolytes such as polyacrylates, polymaleic anhydrides, copolymers of acrylates and sulfonates, and polymers of sulfonated styrenes. However, when used as threshold alkaline earth metal scale inhibitors, large dosages of these polymers are required. These high dosages in turn increase operating costs.

Accordingly, the need exists for an inexpensive, efficient method and composition for inhibiting the formation of alkaline earth metal scales, especially calcium and magnesium scales, on metallic surfaces in contact with water. Scale-forming compounds can be prevented by inactivating either cations or anions by chemical means with chelating or sequestering agents, so that the solubility of the reaction products is not exceeded. Polyelectrolytes, in combination with anionic surfactants, synergistically control alkaline earth metal scale precipitation, especially calcium carbonate precipitation.

It is therefore an object of this invention to provide a composition and method for the inhibition of alkaline earth metal scales over wide pH ranges. These and other objects of the instant invention are accomplished by adding an effective amount of (a) a water soluble anionic polyelectrolyte and (b) an anionic surfactant to an aqueous system, thereby preventing the deposition of alkaline earth metal scales, such as calcium and magnesium scales, on metallic surfaces in contact with said aqueous system, over a wide pH range. This process is especially effective with respect to calcium carbonate scale.

U.S. Pat. Nos. 4,427,568 and 4,324,664 disclose the use of acrylic acid/alkylhydroxy acrylate copolymers with water soluble esters of aliphatic sulphodicarboxylic acid to control scales.

DETAILED DESCRIPTION OF THE INVENTION

The instant invention is directed to a method of inhibiting the precipitation and deposition of alkaline earth metal scales in an aqueous system comprising adding to said system an effective amount of (a) an anionic polyelectrolyte; and (b) an anionic surfactant, wherein the anionic polyelectrolyte/anionic surfactant ratio ranges from 1000:1 to 1:10 by weight.

The instant invention is further directed to a composition comprising: (a) an anionic polyelectrolyte; and (b) an anionic surfactant, wherein said composition is useful for inhibiting or preventing the precipitation of alkaline earth metal scales on metallic surfaces in contact with aqueous systems, and wherein the ratio of said anionic polyelectrolyte to said anionic surfactant is 1000:1 to 1:10.

Any anionic polyelectrolytes may be used in the compositions and process of the present invention. For example, anionic polyelectrolytes such as water soluble anionic polymers of unsaturated monomers, including but not limited to polymers of vinyl acetic acid, acrylic acid, methacrylic acid, $\beta$-carboxyethyl acrylate, crotonic acid, alpha-halo acrylic acid, maleic acid or anhydride, itaconic acid, fumaric acid, 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl or methallyl sulfonic acid, and 3-methacrylamido-2-hydroxy propyl sulfonic acid, alone or in combination, and salts thereof, can be used.

The preferred anionic polyelectrolytes are water soluble polymers of acrylic or methacrylic acid. As representative examples of polymers of acrylic acid and methacrylic acid, there may be mentioned: homopolymers of acrylic acid, homopolymers of methacrylic acid, copolymers of acrylic acid and methacrylic acid, and polymers of acrylic acid and/or methacrylic acid with other polymerizable unsaturated monomers, including but not limited to: acrylamide, methacrylamide, N,N-dimethylacrylamide, vinyl acetic acid, acrylonitrile, $\beta$-carboxyethyl acrylate, crotonic acid, alpha-halo acrylic acid, maleic acid or anhydride itaconic acid, fumaric acid, 2-acrylamido-2-methyl-propylsulfonic acid, 2-methacrylamido-2-methylpropyl-sulfonic acid, styrene sulfonic acid, vinyl sulfonic acid, sulfo alkyl acrylate or methacrylate, allyl or methallyl sulfonic acid, sulfonic acid acrylate, and 3-methacrylamido-2-hydroxy propyl sulfonic acid, alone or in combination, and salts thereof. Also included in this class of polymers are those polymers of acrylamide which are partially hydrolyzed.

The molecular weight of the polyelectrolyte used is not critical. However, preferred molecular weights are from about 1000 to about 5,000,000, as determined by light scattering techniques, and the most preferred molecular weights are from about 1000 to about 20,000.

The most preferred polymers are homopolymers of acrylic acid, homopolymers of methacrylic acid, copolymers of acrylic acid and methacrylic acid, copolymers of acrylic acid or methacrylic acid and acrylamide, copolymers of acrylic acid or methacrylic acid and maleic acid and copolymers of acrylic acid or methacrylic acid and 2-acrylamido-2-methypropyl sulfonic acid, including those disclosed in U.S. Pat. No. 3,928,196 which is hereby incorporated by reference. These latter polymers may have molecular weights of from about 1000 to 100,000, and may contain from about 5 mole % to about 75 mole % 2-acrylamido-2-methylpropyl sulfonic acid and from about 95 mole % to about 25 mole % acrylic acid. Salts of all of the above mentioned polymers may also be used.

The term homopolymer, as used herein, includes polymers made from at least 95%, by weight, of a single monomer but optionally containing up to 5%, by weight, of a random polymerizable unsaturated monomer selected from the above-listed group of polymerizable unsaturated monomers. Likewise, the term copolymer, as used herein, includes polymers which are made from at least 95%, by weight, of the two primary monomers forming the copolymer, but which optionally contain up to 5%, by weight, of a random polymerizable unsaturated monomer or monomers, such as a monomer selected from the above-listed group of polymerizable unsaturated monomers.

The second component required by the instant process and compositions is an anionic surfactant. Any anionic surfactant can be used. Thus, anionic surfactants including, but not limited to, sulfosuccinates, sulfated and phosphate surfactants can be used. The ammonium, sodium and potassium salts of these surfactants are also acceptable due to their high solubility in water. Preferred anionic surfactants include alkylbenzene sulfonates, sulfosuccinates, sulfoesters of fatty acids, sulfated alcohols, sulfated esters, methoxylated and sulfated alcohols, phosphate esters, and sulfonated and phosphated esters of polyethers.

The preferred sulfosuccinates are dialkylsulfosuccinates and their salts. This class includes, but is not limited to, sodium di(2-ethylhexyl)sulfosuccinate, dioctylsulfosuccinate, diisobutylsulfosuccinate, dihexylsulfosuccinate and diamylsulfosuccinate. Another preferred succinate is polyethyleneoxysulfosuccinate.

The preferred sulfated surfactants are sulfated polyoxyethylene alkylphenols. The preferred phosphate surfactants are alkylphosphates, alkyl polyethoxyphosphonic acid and alkylpolyphosphate surfactants, and salts thereof. The most preferred phosphate surfactant is octylphenoxypolyethoxyethylphosphate, or its sodium or potassium salts.

The weight ratio of polyelectrolyte to surfactant should be from 1000:1 to 1:10, preferably 100:1 to 1:5, most preferably 50:1 to 1:5.

An effective amount of the calcium scale inhibiting admixtures disclosed herein means that level of the inhibiting admixture or of each component separately necessary to prevent precipitation of calcium scales in the system being treated. Treatment levels can be from 0.1 ppm to as high as 1000 ppm or above, based on the weight of the aqueous system being treated. The preferred treatment level is from 0.1 to 100 ppm.

Unexpectedly, the instant scale inhibiting admixtures prevent precipitation of alkaline earth metal scales, especially calcium scales such as calcium carbonate, more effectively than either the polyelectrolyte or the surfactant, alone. Thus, due to this synergism, such compositions are improved products in scale inhibition applications. The compositions and process disclosed herein can be used in any cooling water application where threshold inhibition of water borne calcium scales is desired.

The most preferred compositions comprise: polyacrylic acid and dioctylsulfosuccinate, polyacrylic acid and the dihexylsulfosuccinate, polyacrylic acid and octylphenoxypolyethoxyethylphosphate, polyacrylic acid and disodiumethoxylated alcohol half ester of sulfosuccinic acid, a carboxylic acid/sulfonic acid copolymer and dioctylsulfosuccinate, a carboxylic/sulfonic acid copolymer and dihexylsulfosuccinate, a carboxylic acid/sulfonic acid copolymer and octylphenoxypolyethoxyethylphosphate, a carboxylic acid/sulfonic acid copolymer and disodiumethyoxylated alcohol half ester of sulfosuccinic acid, a carboxylic/maleic anhydride copolymer and dioctylsulfosuccinate, a carboxylic acid/maleic anhydride copolymer and dihexylsulfosuccinate, a carboxylic acid/maleic anhydride copolymer and octylphenoxypolyethoxyethylphosphate, and a carboxylic acid/maleic anhydride copolymer and disodiumethoxylated alcohol half ester of sulfosuccinic acid. As referred to immediately above, the preferred carboxylic acids are acrylic acid and methacrylic acid, and the preferred sulfonic acid is 2-acrylamido-2-methylpropylsulfonic acid.

Though it is preferred that compositions or admixtures be added to aqueous systems, the polyelectrolytes and surfactants of the instant invention can be added separately to accomplish the desired inhibition without departing from the spirit of this invention.

EXAMPLES

The following examples illustrate the present invention in greater detail. It should be understood that the invention is not in any way limited by these examples.

The following abbreviations and product names are used in the examples and are defined as indicated:

AA/AMPS = copolymer of acrylic acid and 2-acrylamido-2-methylpropyl sulfonic acid having a weight average molecular weight of about 8200, as determined by low angle laser light scattering (AMPS is a registered trademark of the Lubrizol Corporation).

PAA = polyacrylic acid, approximate MWT 2000, as determined by light scattering.

Belclene 283 = a copolymer of acrylic acid and maleic anhydride or acid, manufactured by Ciba Geigy Monawet MM80 = dihexylsulfosuccinate, manufactured by Mona Chemical Corporation Monawet M070 = dioctylsulfosuccinate, manufactured by Mona Chemical Corporation Triton H-66 = octylphenoxypolyethoxyethylphosphate, available from Rohm & Haas Company.

Aerosol A-102 = disodiumethoxylated alcohol half ester of sulfosuccinic acid, available from American Cyanamid Corporation.

The following examples show the results of stagnant flask tests. For tests run at pH 8.0, bicarbonate solution was added to a flask containing distilled water. Inhibitor, i.e. surfactant and/or polyelectrolyte, was added. A calcium solution was then pipetted into the flask. After swirling to mix, pH was monitored and the flask was stoppered and stored in an oven for 24 hours at 60° C. An aliquot was then removed from the flask. The aliquot was then filtered and titrated for calcium content, to determine percent inhibition.

For each test at pH=8.0, 200 ppm Ca++ and 600 ppm HCO3— were present.

For tests run at pH 9.0, 250 ppm Ca$^{+2}$, 88 ppm CO3= and 512 ppm HCO3— were present. In these tests, the flasks were stoppered and stored at 55° C. in an oven for 24 hours.

EXAMPLES 1-13

Calcium carbonate inhibition was measured at a 0.5 ppm dosage (based on total additives) using an acrylic acid/sulfonic acid copolymer in combination with various surfactants. These results are shown in Table 1 below. These tests were run at pH=8.0.

TABLE 1

| Experiment Number | Polyelectrolyte | Surfactant | Weight Ratio Polyelectrolyte/surfactant | Percent Inhibition |
|---|---|---|---|---|
| 1 | AA/AMPS | — | — | 50 |
| 2* | — | Monawet MO70 | — | 11 |
| 3 | — | Monawet MM80 | — | 6 |
| 4* | — | Triton H-66 | — | 4 |
| 5* | — | Aerosol A-102 | — | 6 |
| 6 | AA/AMPS | Monawet MO70 | 13:1 | 74 |
| 7 | AA/AMPS | Monawet MO70 | 40:1 | 66 |
| 8 | AA/AMPS | Monawet MM80 | 13:1 | 71 |
| 9 | AA/AMPS | Monawet MM80 | 40:1 | 65 |
| 10 | AA/AMPS | Triton H-66 | 13:1 | 73 |
| 11 | AA/AMPS | Triton H-66 | 40:1 | 72 |
| 12 | AA/AMPS | Aerosol A-102 | 13:1 | 82 |
| 13 | AA/AMPS | Aerosol A-102 | 40:1 | 75 |

*2 separate tests were run for examples 2, 4 and 5; the inhibition values shown are averages.

EXAMPLES 14-26

Calcium carbonate inhibition was measured at various dosages (based on the total additive) using an AA-/AMPS copolymer with Triton H-66. Results are shown in table 2, below. These tests were run at pH 8.0.

TABLE 2

| Experiment Number | Polyelectrolyte | Surfactant | Weight Ratio Polyelectrolyte/surfactant | Dosage ppm | Percent Inhibition |
|---|---|---|---|---|---|
| 14 | AA/AMPS | — | — | .25 | 42 |
| 15 | AA/AMPS | — | — | 1.0 | 68 |
| 16 | AA/AMPS | — | — | 2.0 | 79 |
| 17 | AA/AMPS | — | — | 4.0 | 82 |
| 18 | AA/AMPS | — | — | 8.0 | 100 |
| 19 | — | Triton H-66 | — | .25 | 4 |
| 20 | — | Triton H-66 | — | .5 | 12 |
| 21 | — | Triton H-66 | — | 1.0 | 11 |
| 22 | AA/AMPS | Triton H-66 | 13:1 | 0.5 | 71 |
| 23 | AA/AMPS | Triton H-66 | 13:1 | 1.0 | 75 |
| 24 | AA/AMPS | Triton H-66 | 13:1 | 2.0 | 100 |
| 25 | AA/AMPS | Triton H-66 | 13:1 | 4.0 | 88 |
| 26 | AA/AMPS | Triton H-66 | 13:1 | 6.0 | 100 |

*Average of 2 tests

EXAMPLES 27-44

Calcium carbonate inhibitor was measured at the dosages shown, based on total additives, using a polyacrylate with various surfactants. Results are shown in table 3. These tests were run at pH=8.0.

TABLE 3

| Experiment Number | Polyelectrolyte | Surfactant | Weight Ratio Polyelectrolyte/surfactant | Dosage ppm | Percent Inhibition |
|---|---|---|---|---|---|
| 27 | PAA | — | — | 0.25 | 67 |
| 28 | PAA | — | — | 0.5 | 79 |
| 29 | PAA | — | — | 1.0 | 98 |
| 30 | PAA | Triton H-66 | 3:1 | 0.5 | 92 |
| 31 | PAA | Triton H-66 | 10:1 | 0.5 | 96 |
| 32 | PAA | Aerosol A-102 | 3:1 | 0.5 | 81 |
| 33 | PAA | Aerosol A-102 | 10:1 | 0.5 | 86 |
| 34 | PAA | Monawet MO-70 | 10:1 | 0.5 | 70 |
| 35 | PAA | Monawet MO-70 | 10:1 | 0.5 | 83 |
| 36 | Belclene 283 | — | — | 0.25 | 52 |
| 37 | Belclene 283 | — | — | 0.5 | 65 |
| 38 | Belclene 283 | — | — | 1.0 | 92 |
| 39 | Belclene 283 | Triton H-66 | 3:1 | 0.5 | 76 |
| 40 | Belclene 283 | Triton H-66 | 10:1 | 0.5 | 69 |
| 41 | Belclene 283 | Aerosol A-102 | 3:1 | 0.5 | 73 |
| 42 | Belclene 283 | Aerosol A-102 | 10:1 | 0.5 | 71 |
| 43 | Belclene 283 | Monawet MO-70 | 3:1 | 0.5 | 59 |
| 44 | Belclene 283 | Monawet MO-70 | 10:1 | 0.5 | 76 |

EXAMPLES 45-84

Calcium carbonate inhibition was measured at several dosages (based on total additives) using various polyelectrolytes and surfactants. These tests were run at pH=9.0. In these examples, ratios are weight ratios.

TABLE 4

| Experiment Number | Polyelectrolyte | Surfactant | Weight Ratio Polyelectrolyte/surfactant | Dosage ppm | Percent Inhibition |
|---|---|---|---|---|---|
| 45 | PAA | — | — | 5 | 57 |
| 46 | PAA | — | — | 10 | 81 |
| 47 | PAA | — | — | 20 | 86 |
| 48 | PAA | — | — | 30 | 91 |
| 49 | PAA | — | — | 40 | 91 |
| 50 | PAA | — | — | 50 | 89 |
| 51 | AA/AMPS | — | — | 5 | 36 |
| 52 | AA/AMPS | — | — | 10 | 36 |
| 53 | AA/AMPS | — | — | 20 | 48 |
| 54 | AA/AMPS | — | — | 30 | 56 |
| 55 | AA/AMPS | — | — | 40 | 56 |
| 56 | AA/AMPS | — | — | 50 | 57 |
| 57 | PAA | Aerosol A-102 | 3:1 | 5 | 55 |
| 58 | PAA | Aerosol A-102 | 3:1 | 10 | 67 |
| 59 | PAA | Aerosol A-102 | 3:1 | 20 | 91 |
| 60 | PAA | Monawet MM-80 | 3:1 | 5 | 58 |
| 61 | PAA | Monawet MM-80 | 3:1 | 10 | 63 |
| 62 | PAA | Monawet MM-80 | 3:1 | 20 | 96 |
| 63 | PAA | Triton | 5:1 | 5 | 57 |

TABLE 4-continued

| Experiment Number | Polyelectrolyte | Surfactant | Weight Ratio Polyelectrolyte/surfactant | Dosage ppm | Percent Inhibition |
|---|---|---|---|---|---|
| 64 | PAA | Triton H-66 | 5:1 | 10 | 75 |
| 65 | PAA | Triton H-66 | 5:1 | 20 | 95 |
| 66 | PAA | Triton H-66 | 3:1 | 5 | 59 |
| 67 | PAA | Triton H-66 | 3:1 | 10 | 77 |
| 68 | PAA | Triton H-66 | 3:1 | 20 | 96 |
| 69 | PAA | Triton H-66 | 1:1 | 5 | 58 |
| 70 | PAA | Triton H-66 | 1:1 | 10 | 67 |
| 71 | PAA | Triton H-66 | 1:1 | 20 | 89 |
| 72 | PAA | Triton H-66 | 1:5 | 5 | 48 |
| 73 | PAA | Triton H-66 | 1:5 | 10 | 58 |
| 74 | AA/AMPS | Triton H-66 | 5:1 | 5 | 49 |
| 75 | AA/AMPS | Triton H-66 | 5:1 | 10 | 51 |
| 76 | AA/AMPS | Triton H-66 | 5:1 | 20 | 58 |
| 77 | AA/AMPS | Triton H-66 | 3:1 | 10 | 46 |
| 78 | AA/AMPS | Triton H-66 | 3:1 | 20 | 57 |
| 79 | AA/AMPS | Triton H-66 | 1:5 | 5 | 46 |
| 80 | AA/AMPS | Triton H-66 | 1:5 | 10 | 58 |
| 81 | AA/AMPS | Triton H-66 | 1:5 | 20 | 60 |
| 82 | AA/AMPS | Monawet MM-80 | 3:1 | 5 | 11 |
| 83 | AA/AMPS | Monawet MM-80 | 3:1 | 10 | 44 |
| 84 | AA/AMPS | Monawet MM-80 | 3:1 | 20 | 48 |

What is claimed is:

1. A composition useful for inhibiting precipitation of calcium scales in aqueous systems comprising: (a) a water-soluble anionic polyelectrolyte comprising from about 95 mole percent to about 25 mole percent acrylic acid or methacrylic acid and from about 5 mole percent to about 75 mole percent 2-acrylamido-2-methylpropyl sulfonic acid or 2-methacrylamido-2-methylpropylsulfonic acid, and salts of these polymers; and (b) an anionic surfactant selected from the group consisting of octylphenoxy polyethoxyethyl phosphate and its sodium or potassium salts, wherein the ratio of said polyelectrolyte to said surfactant ranges from 50:1 to 1:5 by weight, and wherein the molecular weight of said polyelectrolyte ranges from about 1,000 to about 20,000.

2. The composition of claim 1, wherein said anionic polyelectrolyte is a copolymer of acrylic acid and 2-acrylamido-2-methylpropyl sulfonic acid and salts thereof.

* * * * *